(12) United States Patent
Pärnpuu et al.

(10) Patent No.: US 11,941,571 B2
(45) Date of Patent: Mar. 26, 2024

(54) SYSTEM AND METHOD FOR VENDING ITEMS

(71) Applicant: STARSHIP TECHNOLOGIES OÜ, Tallinn (EE)

(72) Inventors: Rao Pärnpuu, Tabasalu (EE); Javier Amate, Espoo (FI); Phillip Lindberg, Helsinki (FI)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 58 days.

(21) Appl. No.: 17/598,514

(22) PCT Filed: Mar. 20, 2020

(86) PCT No.: PCT/EP2020/057886
§ 371 (c)(1),
(2) Date: Sep. 27, 2021

(87) PCT Pub. No.: WO2020/200854
PCT Pub. Date: Oct. 8, 2020

(65) Prior Publication Data
US 2022/0180306 A1    Jun. 9, 2022

(30) Foreign Application Priority Data

Apr. 1, 2019 (EP) .................................. 19166641

(51) Int. Cl.
*G06Q 10/0832*    (2023.01)
*G06F 21/32*    (2013.01)
(Continued)

(52) U.S. Cl.
CPC ......... *G06Q 10/0832* (2013.01); *G06F 21/32* (2013.01); *G06Q 10/0835* (2013.01); *G06Q 30/0607* (2013.01)

(58) Field of Classification Search
CPC ..................................................... G06Q 10/08
See application file for complete search history.

(56) References Cited

U.S. PATENT DOCUMENTS

| | | |
|---|---|---|
| 4,549,841 A | 10/1985 | Ishige |
| 5,664,928 A | 9/1997 | Stauber |

(Continued)

FOREIGN PATENT DOCUMENTS

WO    2011035839    3/2011

OTHER PUBLICATIONS

Unemployment Insurance Minnesota; "Password: Help! My Account is Locked"; Jan. 7, 2017; https://uimn.org/applicants/videos/password-account-locked-transcript.jsp (Year: 2017).*

(Continued)

*Primary Examiner* — Rupangini Singh
*Assistant Examiner* — David G. Godbold
(74) *Attorney, Agent, or Firm* — Siritzky Law, PLLC

(57) ABSTRACT

A method for delivering restricted items to users includes detecting that a user has selected a restricted item for delivery. A user profile is accessed, and authorization for delivery of the restricted item associated with the user profile is verified. Upon detecting a first authorization associated with the user profile, authorizing the dispatch of the restricted item to the user at a delivery location. The restricted item is transported to the delivery location by the mobile robot. The mobile robot has an item space with a lid and an electronic lock, which is locked during transit. A second authorization to confirm a user's identity before the user receives the restricted item. If the second authorization fails, communication is established between the user and a remote operator terminal via the mobile robot, and the remote operator terminal performs the second authorization and/or repeats the first authorization.

19 Claims, 7 Drawing Sheets

(51) Int. Cl.
  *G06Q 10/0835* (2023.01)
  *G06Q 30/0601* (2023.01)

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,783,379 | B2 | 8/2010 | Beane et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,355,992 | B1 | 1/2013 | Haugh |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 11,105,677 | B2 * | 8/2021 | Lim ...................... G02F 1/1334 |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0201100 | A1 * | 7/2014 | Rellas ................ G06Q 30/0607 |
| | | | 705/330 |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Barragan Trevino et al. |
| 2015/0183581 | A1 | 7/2015 | Worsley |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2017/0286892 | A1 * | 10/2017 | Studnicka .......... G06Q 20/4016 |
| 2018/0020896 | A1 | 1/2018 | High et al. |
| 2018/0165636 | A1 * | 6/2018 | Wilkinson ............... G06F 21/35 |
| 2018/0232796 | A1 | 8/2018 | Glaser et al. |
| 2018/0285880 | A1 | 10/2018 | Jerstroem et al. |
| 2018/0290764 | A1 * | 10/2018 | McMillian ............. B64U 70/90 |
| 2018/0349834 | A1 | 12/2018 | Heinla et al. |

OTHER PUBLICATIONS

Pettitt, Jeniece. "Forget-delivery-drones-meet-your-new-delivery-robot", Nov. 2, 2015, Retrieved from the Internet: URL: https://www.cnbc.com/2015/11/02/forget-delivery-drones-meet-your-new-delivery-robot.html.

Jacobs, Stefan. "Lieferroboter Starship: "Klauen wurde ich ihn nicht"—Auto—Tagesspiegel", Nov. 29, 2015, Retrieved from the Internet: URL: http://www.tagesspiegel.de/mobil/lieferroboter-starship-klauen-wuerde-ich-ihn-nicht/12647114.html + English translation ("I wouldn't steal him").

Baker: "Automated Street Crossing for Assistive Robots", Proceedings of the 2005 IEEE, Jun. 28-Jul. 1, 2005.

WIPO, International Search Report for PCT/EP2020/057886, dated Oct. 8, 2020.

WIPO, Written Opinion of the International Searching Authority for PCT/EP2020/057886, dated Oct. 8, 2020.

* cited by examiner

SYSTEM AND METHOD FOR VENDING ITEMS

Related Applications

This application is the National Stage (a 371) of International Application No. PCT/EP2020/057886, filed Mar. 20, 2020, the entire contents of which are hereby fully incorporated herein by reference for all purposes. PCT/EP2020/057886 claims the priority benefit of European patent application EP 19166641.1, filed Apr. 1, 2019, the entire contents of which are hereby fully incorporated herein by reference for all purposes.

FIELD

The invention relates to vending items. More specifically, the invention relates to vending items via mobile robots.

INTRODUCTION

Online shopping is on the rise, with more and more people regularly purchasing items online for delivery. Additionally, it is more and more often the case that items can be purchased without any direct interaction with a vendor, but rather through an automated purchase procedure. For example, self-checkout lanes, vending machines, automated supermarkets or shopping kiosks or the like provide such an experience. Advantageously, access to items at any hours or streamlined access to items can be achieved in this way.

Both online shopping and automated vending points may sometimes be offering restricted goods or items, such as age-restricted items, prescription items or the like. Traditionally, a vendor would verify the customer's identity before selling them such a restricted item. With the automated process, automatic identity and authorization verification should be implemented.

Some such implementations are known. For instance, US patent application 2018/0232796 A1 discloses a system and method for a dynamic customer checkout experience within an automated shopping environment that includes generating a virtual cart for the customer through an automatic checkout system; tracking location of the customer; generating an assessment of the virtual cart; and selecting a processing mode for the customer based in part on the assessment and executing the processing mode within at least one computing device in coordination with the location of the entity. Age verification for products such as alcohol can be performed.

Similarly, U.S. Pat. No. 7,783,379 B2 discloses devices and methods for vending regulated products, particularly controlled substances, including those containing pseudoephedrine. The present invention allows for the identification of consumers through reliable log-in-procedures, allows the consumer to select items, validates whether the purchase request complies with regulations, to facilitate the delivery of the requested product to a consumer.

Other embodiments include a vending machine that is placed into a retail environment in which software enforces validation of the purchasers' identities, limits the amount of pseudoephedrine for each purchaser within the regulations of local, state and federal agencies.

Also, U.S. Pat. No. 8,355,992 B1 discloses a system and method for verifying the age of a controlled substance purchaser are disclosed. The system and method in an example embodiment include receiving biometric data corresponding to a consumer who has presented an age-restricted product for purchase at a point of sale location; generating an age verification request including the biometric data; sending the age verification request to a central computer via a data network; receiving a response message from the central computer via the data network, the response message including information for determining whether the consumer is of sufficient age to purchase the age-restricted product; and denying purchase of the age-restricted product if the consumer is determined to not be of sufficient age to purchase the age-restricted product.

Further, US patent application 2018/0285880 A1 discloses a mobile device that includes biometric sensor(s), and a processor that causes the biometric sensor(s) to acquire a physiological marker of a user, and identify and authenticate the user. The processor sends a message to an authentication server that indicates the user is authenticated, and receives a response from the authentication server that includes a unique authentication code. The processor receives selection of a thereby selected over-the-counter (OTC) drug, and communicates with a point-of-sale (POS) system with contactless payment capability. The processor sends a purchase message to the POS system that includes the unique authentication code, an identifier of the selected OTC drug, and payment information. And the POS system communicates with the authentication server to validate the unique authentication code, and with an authorization server to authorize payment for the selected OTC drug based on the payment information.

Recently, mobile robots have been used for more and more tasks. The robots are frequently used both in indoor and outdoor settings. Such robots can serve to deliver items to recipients or to provide a vending service among other things. Delivery items can also transport restricted goods or items (such as age restricted) to recipients.

SUMMARY

It is the object of the present invention to provide an improved and reliable way of delivering items to recipients or users of a delivery service. Further, it is also the object to disclose mobile robots configured to deliver and/or transport restricted items. Particularly, it is also the object of the present invention to provide an authorization procedure for mobile robot deliveries.

In a first embodiment, a method for delivering restricted items to users is disclosed. The method comprises detecting a restricted item selected by a user for delivery. The method further comprises accessing a user profile associated with the user. The method also comprises verifying presence of an authorization for delivery of the restricted item associated with the user profile. The method further comprises, upon detecting a first authorization associated with the user profile, authorizing dispatch of the restricted item to the user at a delivery location.

The term "restricted items" refers herein to any item that can only be purchased or otherwise obtained with appropriate authorization or under certain conditions. Such items may comprise alcoholic beverages, tobacco products, controlled substances, prescription medication, or other similar items. Furthermore, restricted items may also comprise sensitive materials such as personal documents, contracts, mail, or the like. The authorization may refer to age-based verification, personal authentication (as in the case of prescription medication for example) or the like.

The term "authorization" is used herein as any type of a verification process used to determine a person's identity. This can be an in-person verification where the person presents their ID to an authorized person and they perform the authorization. Additionally or alternatively, the authorization can comprise remote authorization based on identification documents and one or more biometric parameters of the person to be authenticated. For example, the first authorization may comprise verifying a person's identity by comparing them to an identification document with a photo, and establishing that the identification document is genuine (by e.g. verifying the presence of markers such as a hologram). Such an authorization can be performed via a camera of a person's personal computing device (such as a phone, laptop, tablet, etc). The first authorization is generally intended to be a "stronger" authorization, and the conditions for it stricter than for any subsequent authorizations. The first authorization can generally be outsourced to a third-party service fulfilling the necessary legal requirements.

The user profile may be stored in a database on a server and may contain information relating to the user's orders or purchases, address, method of payment and other relevant user details. The first authorization, once performed, may be stored with the user profile or in a separate database, but associated with the user profile (for example, the path to the stored first authorization may be present in the user profile).

The first authorization as associated with the user profile may comprise one or more parameters. These can be, for example, biometric parameters. For instance, a picture as shown on an official identification document of a user may be stored. Additionally or alternatively, the user's fingerprint, retina scan, voice, DNA authentication or the like can be stored with the first authorization. Further, the first authorization may also comprise non-biometric user-selected parameters. For example, a user-selected password, pin code, pattern or the like may be stored with the first authorization. These parameters may then be used for a second authorization, which need not be as strict as the first authorization, but is nonetheless secure and valid, as it then accesses and verifies parameters associated with the first authorization.

The term "associated with" can be interpreted as having a direct connection with. In other words, the first authorization may either be stored as part of the user profile, or be unambiguously linked to it via a common ID number or the like.

The method can generally be performed by a server with a plurality of databases associated with it.

In some embodiments, the method can further comprise, prior to the user receiving the restricted item, performing a second authorization to confirm a user's identity. The second authorization can advantageously ensure that the user receiving the item is the same user that ordered the item and that the user is authorized for receiving restricted items. Furthermore, advantageously, the second authorization may be less strict or demanding than the first authorization, while still ensuring valid and secure user identification. In other words, the second authorization may depend on the first authorization and on the various parameters stored with it that allow for a confirmation of the user identity.

In some such embodiments, the second authorization can comprise matching at least one personal identification parameter of the user with the user profile comprising the first authorization. The personal identification parameter may be associated with the first authorization. In this context, "associated with" may refer to the personal identification parameter being stored as part of the first authorization, or unambiguously connected to it via the user profile, a user ID number or the like. In other words, the user may be prompted to input a personal identification parameter to obtain the second authorization. Once input, the parameter may be compared with the corresponding parameter stored with the first authorization associated with the user's profile. In this way, the second authorization can advantageously be performed quicker and easier for the user while ensuring their identification.

In some such embodiments, the personal identification parameter can comprise a user-selected pin. The pin can also comprise a password, pattern or the like. Advantageously, the user of a user-selected pin or password can ensure that the user receiving the restricted item is the same user as the one ordering the restricted item (and authorized to do this due to the presence of the first authorization).

In some such embodiments the user-selected pin can be selected by the user during or promptly following the first authorization and is associated with the first authorization.

In some embodiments, the personal identification parameter can comprise a biometric parameter of the user. The biometric parameter can comprise, for example, the user's face (obtained via a photo), a retinal scan, a fingerprint, voice sample, DNA authentication or the like. Using a biometric parameter can allow for additional authenticity of the second verification, since it can ensure that the user receiving the restricted item is the same user that ordered it.

In some embodiments, the second authorization can be performed at the delivery location. In some such embodiments, the second authorization can be performed immediately prior to the user receiving the restricted item. Advantageously, this can allow for a verification of the user's identity immediately preceding the transfer of the restricted item into the user's possession. This can minimize the risk of the restricted item being transferred to a non-authorized person.

In some embodiments, the method can further comprise transporting the restricted item to the delivery location by a mobile robot. The mobile robot can be an autonomous and/or a semi-autonomous robot. In other words, the mobile robot can be configured to navigate and travel to the delivery location at least partially autonomously. The mobile robot is preferably configured to travel on sidewalks and other pedestrian walkways. The mobile robot can be configured to transfer the package to the user (or recipient) at the delivery location. The "authorizing dispatch" step of the method may refer to authorizing dispatch of the mobile robot carrying the user's items including the restricted items to the delivery location. Advantageously, the use of a mobile robot to dispatch items to recipients may allow to reduce fuel use, optimize delivery times and ensure prompt delivery.

In some embodiments, the method can further comprise the mobile robot performing the second authorization upon reaching the delivery location. That is, the mobile robot may comprise at least one identification sensor and the method may further comprise the mobile robot using the identification sensor to perform the second authorization. This can be particularly useful, since the second authorization may be performed entirely via the mobile robot, allowing for a simple procedure. Particularly, the authorization can, in this case, be performed even without the mobile robot connecting to a server if the user's profile and/or the first authorization details are preloaded onto the mobile robot's local memory.

In some such embodiments, the identification sensor can comprise a biometric sensor and the method can further comprise measuring at least one biometric parameter of the user via the biometric sensor. For example, such a sensor can comprise a fingerprint sensor, a camera, a retina scanner, a DNA sensor and/or a microphone.

In some embodiments the mobile robot can comprise an enclosed item space configured to hold the restricted item and the method can further comprise the mobile robot granting access to the item space upon confirming the user's identity. The item space can comprise a compartment accessible via a lid. The compartment may be locked during transit and until the user has been authorized to remove the restricted item (that is, until the second authorization is successfully performed). Granting access to the item space may refer to unlocking the lid of the item space thereby allowing the user to open it and access the restricted item (and possibly other items that are part of their order).

In some embodiments, the method can further comprise denying access to the item space upon a failed confirmation of the user's identity. In other words, if the user's identity is not successfully confirmed at the delivery location, the mobile robot performing the delivery may not open the lid of the item space and may simply leave the delivery location without transferring the restricted item to the user. In some embodiments, the mobile robot may comprise a separate compartment for restricted items. In this case, the mobile robot may grant the user access to the compartment with items (that the user ordered) that are not restricted, but not to the restricted items compartment.

In some embodiments, the method can further comprise the mobile robot departing the delivery location without transferring the restricted item to the user. Advantageously, this allows for denying non-authorized users access to restricted items. The robot may do this if the user cannot be authorized at the delivery location.

In some embodiments, the method can further comprise performing the second authorization via a user terminal. The user terminal may comprise a personal computing device such as a smartphone, a tablet, a laptop, a wearable computing device or the like. In other words, the user may also be authenticated via their own device by communicating with the specific platform associated with the delivery service.

In some embodiments, the user terminal can be associated with the user profile. In some such embodiments, the user terminal can be associated with the first authorization. In other words, the user terminal may be validated during the first authorization and saved as one of the parameters of the first authorization. This can be done, for example, if the first authorization is performed via the user terminal (e.g. a smartphone).

In some embodiments, the method can further comprise prompting the user to select at least one of the following second authorization procedures. The second authorization may be performed via the user terminal. The mobile robot may perform the second authorization. That is, advantageously, there may be a choice of the second authorization, which may further allow to streamline the process and ensure speedy transfer of the restricted item to the user. Furthermore, if the user's user terminal does not have the necessary sensors to perform the second authorization (e.g. biometric sensors), this can be then done via the mobile robot.

In some such embodiments the method can further comprise, upon a failed attempt to perform the second authorization, prompting the user to perform the second authorization by another second authorization procedure, different from the failed procedure. For instance, if the user terminal's sensor necessary to perform the second authorization is malfunctioning, the authorization can still be performed via the mobile robot.

In some such embodiments, the method can further comprise, upon a failed attempt to perform the second authorization, establishing communication between the user and a remote operator terminal. The remote operator terminal may be associated with an authorized person that can manually perform the second authorization. This failsafe can ensure that authorized users receive their restricted items even when the automatic second authorization is not possible or has failed multiple times.

In some embodiments, the method can further comprise the remote operator terminal performing at least one of the second authorization and a repetition of the first authorization. This may be advantageous, as the second authorization is generally associated with and dependent on the valid first authorization associated with the user profile. Then, if any malfunction occurs and the association is broken, the first authorization corrupted or expired, it may not be possible to perform the second authorization. Then, the first authorization, which may be stricter and dependent on official identification of the user should be repeated.

In some embodiments, the remote operator terminal can be configured to communicate with the user via the user terminal. In other words, the connection may be established via the user's personal computing device and an interface such as an app.

In some embodiments, the method can further comprise, upon detecting no first authorization associated with the user profile, prompting the user to perform the first authorization. In other words, when a user first attempts to order or request a restricted item for delivery, they may be prompted to perform a first authorization.

In some such embodiments, the method can further comprise denying delivery of the restricted item to the user until the first authorization is associated with the user profile.

In some embodiments, the method can further comprise verifying validity of the first authorization at predetermined intervals. In other words, the first authorization can be periodically accessed e.g. by a server subroutine. The first authorization may be valid only for a certain period of time (e.g. until the identification document used for it expires, or for a set period of time after which it must be repeated), and it can be useful to periodically check whether it is still valid. The check may also be performed each time that the user attempts to order or request a restricted item for delivery.

In some embodiments, the method can further comprise transporting the restricted item to the delivery location. In some such embodiments, the method can also comprise allowing access to the restricted item at the delivery location to a recipient different than the user. The recipient may be identified as such prior to an authorization of dispatch of the restricted item and/or after the dispatch. In other words, when ordering a restricted item, the user may indicate that it will be received by someone else. In this case, prior to dispatching the item, a first recipient authorization may be verified as opposed to the first authorization.

In some such embodiments, the restricted item can be transmitted to the recipient following a successful second recipient authorization. The second recipient authorization may be analogous to the second authorization (as applied to the user when the user is also the recipient). Advantageously, chain of custody of the item is still maintained while allowing users a more flexible delivery of restricted items (since they do not need to receive them themselves, but can delegate it to recipients).

In some embodiments, the method can further comprise transporting the restricted item to the delivery location followed by detecting a recipient different than the user at the delivery location. The method can then further comprise verifying presence of a recipient profile associated with the user profile. The method can then also comprise verifying presence of an authorization for delivery of the restricted item associated with the user profile. The method can then also comprise, upon detecting a first recipient authorization associated with the recipient profile, performing a second recipient authorization to confirm a recipient's identity. The method can then further comprise, upon successful second recipient authorization, allowing the recipient access to the restricted item.

In other words, a person other than the user may also receive the restricted item at the delivery location. This person may be denoted as the recipient or item recipient. For this person to be authorized to receive the restricted item (and any other items ordered or requested for delivery by the user), the recipient must have been "registered" with a recipient profile, associated with (and/or being part of) the user profile. This can be done prior to or after the recipient ordering the restricted item, but should be done before the recipient can receive the restricted item. Furthermore, the recipient then also needs to undergo a first recipient authorization, analogous to the first authorization, as well as preferably a second recipient authorization directly prior to receiving the restricted item. These authorizations can be analogous for the user and the recipient.

Advantageously, having a recipient receive a restricted item on behalf of the user (or simply instead of the user) may allow for more flexibility in terms of delivery location and time for the user or simply be more convenient. The recipient profile associated with (or being part of) the user profile ensures that the recipient is authorized to receive items on behalf of the user that requested the delivery. Further, the first recipient authorization ensures that the recipient is also authorized to receive restricted items.

It may also be the case that the user does not have the first authorization allowing them to receive the restricted item, but the recipient does. For example, the user may order a particular medicine that they have no prescription for, but the recipient does, and therefore is authorized to receive (preferably upon completion of a second recipient authorization). In this case, the first recipient authorization must be verified before the medicine can be dispatched. In other words, upon receiving an order or a request for a restricted item and not detecting a first authorization allowing for the delivery of the restricted item to the user, further recipient profiles associated with the given user profile may be investigated to detect whether a particular recipient may be authorized to receive the restricted item. The user may then be prompted to indicate whether the authorized recipient would be receiving the restricted item at the delivery location (additionally or alternatively, the user may also input the recipient without being prompted to).

In another embodiment, a method for delivering restricted items to recipients is disclosed. The method comprises detecting a restricted item selected by a user for delivery to a recipient. The method also comprises accessing a user profile associated with the user. The method further comprises verifying presence of a recipient profile associated with the user profile. The method also comprises verifying presence of an authorization for delivery of the restricted item associated with the recipient profile. The method further comprises, upon detecting a first recipient authorization associated with the recipient profile, authorizing dispatch of the restricted item to the user at a delivery location.

In other words, the present advantageous method may also be used to deliver restricted items to recipients differing from users actually placing the order or requesting the delivery of the restricted items. To maintain chain of custody, the recipient must then be associated with the user and also be properly authorized to receive the restricted item.

The present embodiment can also analogously implement the features of the delivery method as described above with a caveat that a recipient receives the item as opposed to the user. For instance, a second recipient authorization may preferably be performed prior to the recipient receiving the restricted item. The first and second recipient authorizations may be analogous to the first and second authorizations.

In one particular example, recipient profiles can be used to allow access to household or family members to items ordered by a user. In other words, family accounts may be set up with one primary user and a plurality of recipients, each having different authorizations for restricted items. This can advantageously allow one member of a household to order particular restricted items that only one of the associated recipients is authorized to receive without the user having the required authorization themselves, as long as the first recipient authorization is present.

In a second embodiment, a system for delivering restricted items to users is disclosed. The system comprises an item database of items for delivery, the item database comprising restricted items. The system further comprises a user interface configured to access the item database. The system also comprises a user database comprising user profiles. The system also comprises a processing component. The processing component is configured to at least detect a restricted item from the item database selected by a user for delivery via the user interface. The processing component is also configured to at least access a user profile associated with the user in the user database. The processing component is further configured to at least verify presence of an authorization for delivery of the restricted item associated with the user profile. The processing component is also configured to at least, upon detecting a first authorization associated with the user profile, authorize dispatch of the restricted item to the user at a delivery location.

The processing component may comprise a server, a collection of servers, a cloud server, a distributed computing network or the like.

The system can advantageously be configured to carry out the method as described in the preceding embodiments.

In some embodiments, the processing component can be further configured to perform a second authorization to confirm a user's identity prior to the user receiving the restricted item. That is, the second authorization can be performed by the processing component remotely, via a connection to a user interface or the like.

In some embodiments, the system can further comprise a user terminal configured to exchange data with the processing component. The user terminal can comprise a personal computing device such as a smartphone, tablet, laptop, wearable computing device or the like. The user terminal may be configured to access the user interface (which may comprise a program such as an app).

In some such embodiments, the processing component can be configured to perform a second authorization based on data received from the user terminal to confirm a user's identity prior to the user receiving the restricted item. In some such embodiments, the second authorization can comprise matching at least one personal identification parameter of the user input via the user terminal with the user profile comprising the first authorization. In other words, the second authorization may be dependent on information stored with the first authorization. For example, the second authorization may be performed by the user inputting a certain pin, code, password or pattern, or by a user submitting a biometric parameter (e.g. fingerprint scan). The user input is then compared with parameters stored with the first authorization, and if a match is made, the second authorization is successful. This can advantageously allow the second authorization to be less strict and time consuming than the first one, while remaining just as reliable and accurate (as it depends on data obtained with the first authorization).

In some embodiments, the user terminal can further comprise at least one biometric sensor configured to detect at least one biometric parameter of the user. The biometric sensor can comprise at least one of a camera, a fingerprint sensor, a retina scanner, a microphone, a DNA scanner or the like.

In some such embodiments, the user terminal can be configured to send the detected biometric parameter to the processing component and the processing component can be configured to validate the association between the first authorization and the biometric parameter stored in the user profile. That is, the processing component can verify that the received biometric parameter corresponds to the one stored on file with the first authorization (e.g. in the case of a camera image, the processing component can compare an image of the user stored on file with the picture received from the user terminal camera).

In some embodiments, the system can further comprise a mobile robot configured to transport restricted items to the delivery location. The mobile robot can be as described above and below with respect to the method embodiments and the figures.

In some such embodiments, the mobile robot can be configured to communicate with the processing component in order to perform a second authorization of the user at the delivery location. That is, the mobile robot can comprise a communication component such as a modem, SIM card, or a plurality of such components.

In some such embodiments, the mobile robot can comprise an enclosed item space configured to hold the restricted item and inaccessible without the second authorization. The item space may comprise a compartment within the mobile robot covered by a lid with a lock. The mobile robot may also comprise a plurality of compartments to separate restricted items and non-restricted items.

In some such embodiments, the mobile robot can comprise at least one identification sensor and wherein the mobile robot is configured to send user identification data from the identification sensor to the processing component to perform the second authorization. The identification sensor may comprise a camera, a fingerprint reader, a retina reader, a microphone, a DNA scanner and/or an input terminal for entering a code or a pattern.

In some such embodiments, the identification sensor can comprises a biometric sensor and the mobile robot can be configured to measure at least one biometric parameter of the user via the biometric sensor.

In some embodiments, the mobile robot can be configured to grant access to the item space after the second authorization has been performed. Advantageously, this can ensure that only a properly authorized person receives a restricted item. If the mobile robot comprises a plurality of compartments (that are individually lockable), the mobile robot can still grant access to the ones where non-restricted items are stored (even if the second authorization fails), so that the user may retrieve those items, but not the restricted items.

In some embodiments, the item space can comprise an electronic lock configured to unlock upon a successful second authorization.

In some embodiments, the system can further comprise a remote operator terminal. The remote operator terminal may be associated with an authorized person.

In some such embodiments, the remote operator terminal can be configured to communicate with the user upon a failed second authorization. The communication can be done via the mobile robot and/or via the user terminal.

In some such embodiments, the remote operator terminal can be further configured to perform at least one of the second authorization and a repetition of the first authorization.

In some embodiments, the user database can further comprise recipient profiles associated with user profiles. In other words, the recipient profiles may be part of the user profiles, or separate profiles unambiguously connected to the user profiles. The recipient profiles can be advantageously used to allow for delivery of restricted items to recipients differing from the users. That is, a certain user associated with a user profile may request a restricted item to be delivered to a recipient associated with a recipient profile in turn associated with the user profile.

In some such embodiments, the processing component can be further configured to detect a restricted item selected by a user for delivery to a recipient. It can also be further configured to access a user profile associated with the user. It can also be configured to verify presence of a recipient profile associated with the user profile. It can further be configured to verify presence of an authorization for delivery of the restricted item associated with the recipient profile. It can also be configured to, upon detecting a first recipient authorization associated with the recipient profile, authorize dispatch of the restricted item to the user at a delivery location.

This can be particularly useful, as having recipient profiles associated with user profiles may allow users greater flexibility in ordering restricted items, since they do not need to be at the delivery location to receive the item, but can have the recipient do this. The chain of custody of the restricted item can be ensured by the first and preferably second recipient authorization confirming that the recipient is authorized to receive the restricted item.

The mobile robot can be an autonomous or a semi-autonomous robot configured for ground-based travel. Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

The present invention is also defined by the following numbered embodiments.

Below is a list of method embodiments. Those will be indicated with a letter "M". Whenever such embodiments are referred to, this will be done by referring to "M" embodiments.

M1. A method for delivering restricted items to users, the method comprising
Detecting a restricted item selected by a user for delivery;
Accessing a user profile associated with the user;
Verifying presence of an authorization for delivery of the restricted item associated with the user profile;
Upon detecting a first authorization associated with the user profile, authorizing dispatch of the restricted item to the user at a delivery location.

M2. The method according to the preceding embodiment further comprising, prior to the user receiving the restricted item, performing a second authorization to confirm a user's identity.

M3. The method according to the preceding embodiment wherein the second authorization comprises matching at least one personal identification parameter of the user with the user profile comprising the first authorization.

M4. The method according to the preceding embodiment wherein the personal identification parameter is associated with the first authorization.

M5. The method according to the preceding embodiment wherein the personal identification parameter comprises a user-selected pin.

M6. The method according to the preceding embodiment wherein the user-selected pin is selected by the user during or promptly following the first authorization and is associated with the first authorization.

M7. The method according to any of the three preceding embodiments wherein the personal identification parameter comprises a biometric parameter of the user.

M8. The method according to any of the preceding embodiments and with features of embodiment M2 wherein the second authorization is performed at the delivery location.

M9. The method according to any of the preceding embodiments and with features of embodiment M2 wherein the second authorization is performed immediately prior to the user receiving the restricted item.

M10. The method according to any of the preceding embodiments further comprising transporting the restricted item to the delivery location by a mobile robot.

M11. The method according to the preceding embodiment and with the features of embodiment M2 further comprising the mobile robot performing the second authorization upon reaching the delivery location.

M12. The method according to the preceding embodiment wherein the mobile robot comprises at least one identification sensor and wherein the method further comprises the mobile robot using the identification sensor to perform the second authorization.

M13. The method according to the preceding embodiment wherein the identification sensor comprises a biometric sensor and wherein the method further comprises measuring at least one biometric parameter of the user via the biometric sensor.

M14. The method according to any of the three preceding embodiments and with features of embodiment M2 wherein the mobile robot comprises an enclosed item space configured to hold the restricted item and wherein the method further comprises the mobile robot granting access to the item space upon confirming the user's identity.

M15. The method according to the preceding embodiment further comprising denying access to the item space upon a failed confirmation of the user's identity.

M16. The method according to the preceding embodiment further comprising the mobile robot departing the delivery location without transferring the restricted item to the user.

M17. The method according to any of the preceding embodiments and with the features of embodiment M2 further comprising performing the second authorization via a user terminal.

M18. The method according to the preceding embodiment wherein the user terminal is associated with the user profile.

M19. The method according to any of the two preceding embodiments wherein the user terminal is associated with the first authorization.

M20. The method according to any of the three preceding embodiments and with the features of embodiment M10 further comprising prompting the user to select at least one of the following second authorization procedures:
Performing the second authorization via the user terminal; and
The mobile robot performing the second authorization.

M21. The method according to the preceding embodiment further comprising, upon a failed attempt to perform the second authorization, prompting the user to perform the second authorization by another second authorization procedure, different from the failed procedure.

M22. The method according to any of the preceding embodiments and with the features of embodiment M2 further comprising, upon a failed attempt to perform the second authorization, establishing communication between the user and a remote operator terminal.

M23. The method according to the preceding embodiment wherein the method further comprises the remote operator terminal performing at least one of
The second authorization; and
A repetition of the first authorization.

M24. The method according to any of the two preceding embodiments and with the features of embodiment M17 wherein the remote operator terminal is configured to communicate with the user via the user terminal.

M25. The method according to any of the preceding embodiments further comprising upon detecting no first authorization associated with the user profile, prompting the user to perform the first authorization.

M26. The method according to the preceding embodiment further comprising denying delivery of the restricted item to the user until the first authorization is associated with the user profile.

M27. The method according to any of the preceding embodiments further comprising verifying validity of the first authorization at predetermined intervals.

M28. The method according to any of the preceding embodiments further comprising transporting the restricted item to the delivery location.

M29. The method according to the preceding embodiment further comprising allowing access to the restricted item at the delivery location to a recipient different than the user.

M30. The method according to the preceding embodiment wherein the restricted item is transmitted to the recipient following a successful second recipient authorization.

M31. The method according to any of the preceding embodiments further comprising Transporting the restricted item to the delivery location; and
- Detecting a recipient different than the user at the delivery location; and
- Verifying presence of a recipient profile associated with the user profile;
- Verifying presence of an authorization for delivery of the restricted item associated with the user profile;
- Upon detecting a first recipient authorization associated with the recipient profile, performing a second recipient authorization to confirm a recipient's identity; and
- Upon successful second recipient authorization, allowing the recipient access to the restricted item.

M32. A method for delivering restricted items to recipients, the method comprising
- Detecting a restricted item selected by a user for delivery to a recipient;
- Accessing a user profile associated with the user;
- Verifying presence of a recipient profile associated with the user profile;
- Verifying presence of an authorization for delivery of the restricted item associated with the recipient profile;
- Upon detecting a first recipient authorization associated with the recipient profile, authorizing dispatch of the restricted item to the user at a delivery location.

M33. The method according to the preceding embodiment further comprising any features of embodiments M2 to M31.

Below is a list of system embodiments. Those will be indicated with a letter "S". Whenever such embodiments are referred to, this will be done by referring to "S" embodiments.

S1. A system for delivering restricted items to users, the system comprising
- An item database of items for delivery, the item database comprising restricted items;
- A user interface configured to access the item database;
- A user database comprising user profiles;
- A processing component configured to at least:
- Detect a restricted item from the item database selected by a user for delivery via the user interface;
- Access a user profile associated with the user in the user database;
- Verify presence of an authorization for delivery of the restricted item associated with the user profile;
- Upon detecting a first authorization associated with the user profile, authorize dispatch of the restricted item to the user at a delivery location.

S2. The system according to the preceding embodiment wherein the processing component is further configured to perform a second authorization to confirm a user's identity prior to the user receiving the restricted item.

S3. The system according to the preceding embodiment further comprising a user terminal configured to exchange data with the processing component.

S4. The system according to the preceding embodiment wherein the processing component is configured to perform a second authorization based on data received from the user terminal to confirm a user's identity prior to the user receiving the restricted item.

S5. The system according to the preceding embodiment wherein the second authorization comprises matching at least one personal identification parameter of the user input via the user terminal with the user profile comprising the first authorization.

S6. The system according to any of the three preceding embodiments wherein the user terminal further comprises at least one biometric sensor configured to detect at least one biometric parameter of the user.

S7. The system according to the preceding embodiment wherein the user terminal is configured to send the detected biometric parameter to the processing component and the processing component is configured to validate the association between the first authorization and the biometric parameter stored in the user profile.

S8. The system according to any of the preceding system embodiments further comprising a mobile robot configured to transport restricted items to the delivery location.

S9. The system according to the preceding embodiment and with features of embodiment S2 wherein the mobile robot is configured to communicate with the processing component in order to perform a second authorization of the user at the delivery location.

S10. The system according to the preceding embodiment wherein the mobile robot comprises an enclosed item space configured to hold the restricted item and inaccessible without the second authorization.

S11. The system according to any of the two preceding embodiments wherein the mobile robot comprises at least one identification sensor and wherein the mobile robot is configured to send user identification data from the identification sensor to the processing component to perform the second authorization.

S12. The system according to the preceding embodiment wherein the identification sensor comprises a biometric sensor and wherein the mobile robot is configured to measure at least one biometric parameter of the user via the biometric sensor.

S13. The system according to any of the preceding system embodiments and with features of embodiment S10 wherein the mobile robot is configured to grant access to the item space after the second authorization has been performed.

S14. The system according to the preceding embodiment wherein the item space comprises an electronic lock configured to unlock upon a successful second authorization.

S15. The system according to any of the preceding embodiments further comprising a remote operator terminal.

S16. The system according to the preceding embodiment and with the features of embodiment S2 wherein the remote operator terminal is configured to communicate with the user upon a failed second authorization.

S17. The system according to the preceding embodiment wherein the remote operator terminal is further configured to perform at least one of
- The second authorization; and
- A repetition of the first authorization.

S18. The system according to any of the preceding system embodiments wherein the user database further comprises recipient profiles associated with user profiles.

S19. The system according to the preceding embodiment wherein the processing component is further configured to
- Detect a restricted item selected by a user for delivery to a recipient;
- Access a user profile associated with the user;
- Verify presence of a recipient profile associated with the user profile;
- Verify presence of an authorization for delivery of the restricted item associated with the recipient profile;

Upon detecting a first recipient authorization associated with the recipient profile, authorize dispatch of the restricted item to the user at a delivery location.

The present technology will now be discussed with reference to the accompanying drawings.

DESCRIPTION OF EMBODIMENTS

Figure 1:
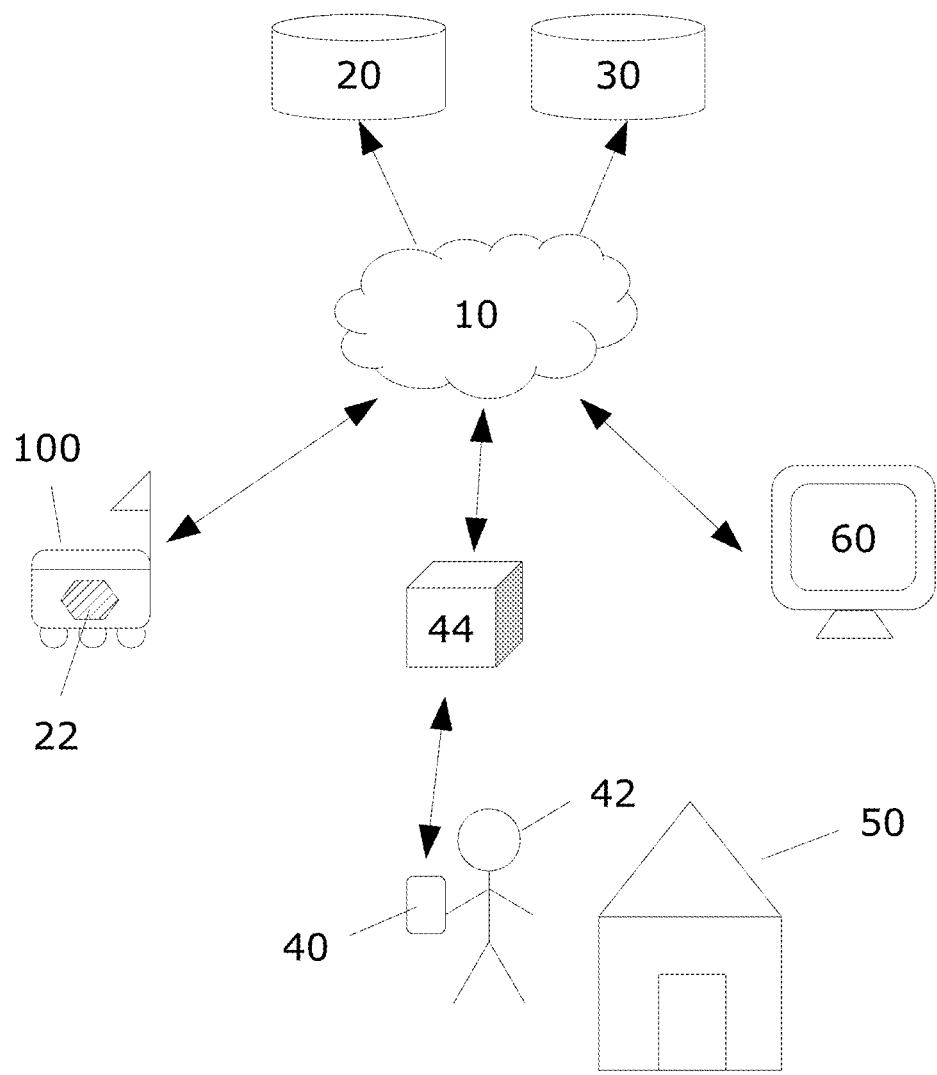
FIG. 1 schematically depicts an embodiment of a system for delivering restricted items to users.

FIG. 1 schematically depicts an embodiment of a system for delivering restricted items to users. Not all elements of the system are essential for the implementation, some are optional as described below.

A processing component 10 coordinates communication and computing within the system. The processing component 10 may comprise a server such as a cloud server, a plurality of servers, distributed computing resources or the like.

Two databases 20 and 30 are depicted. Item database 20 comprises data on all the items that can be ordered or requested for delivery. Among other items, restricted items 22 can be part of the items present in the item database 20. Restricted items 22 can have certain flags or restrictions associated with them. For example, the restrictions might comprise a user age threshold (such as in the case of alcoholic beverages, tobacco or similar products), a prescription requirement (such as in the case of medical products or the like), a personal authentication requirement (as in the case of personal documents or mail delivery) or a similar restriction.

User database 30 comprises user profiles 32 (not depicted). The user profiles 32 are associated with users 42. The user profile 32 may comprise a first authorization allowing user 42 associated with the given user profile 32 to order restricted items 22. The first authorization may correspond to an identity confirmation tied to the user's official identity documentation. The first authorization may comprise one or more distinct authorizations. For example, a user profile 32 may comprise a first authorization to purchase alcohol, as well as purchase certain prescription medication. The first authorization preferably comprises at least one biometric parameter associated with the user 42.

A user 42 may communicate with the processing component 10 via a user terminal 40 and optionally through a user interface 44. The user terminal 40 may comprise a personal computing device such as a smartphone, tablet, wearable device or the like. The user interface 44 may comprise a software application configured to run on the user terminal 40, such as a mobile app for example. The user terminal and the user interface are optional, as the user may also order items via other means.

A mobile robot 100 is schematically depicted transporting a restricted item 22. The mobile robot 100 can be as described in relation to FIG. 4. The restricted item 22 may be securely stored in the mobile robot's item space during transport and prior to giving the user 42 access to it. The mobile robot 100 can transport the restricted item 22 (among other possible items) to a delivery location 50. The delivery location 50 is depicted as the user's residence, but may also be any location selected by the user and/or accessible for delivery.

The system can also optionally comprise a remote operator terminal 60. The remote operator terminal 60 may communicate with the processing component 10 (as shown in FIG. 1) and/or directly communicate with the user 42, preferably via the user terminal 40. The remote operator terminal 60 may enable an authorized person (an operator) to troubleshoot the authorization process in order to grant the user 42 access to the restricted item 22. The remote operator terminal 60 may be used if automatic methods of authorizing user access fail.

In an exemplary embodiment, the system for delivering restricted items may function as follows. A user 40 (such as a customer) may wish to order some goods to be delivered. They may access the item database 20 via their user terminal 40 and select some goods for purchase. Among other goods, they may select an alcoholic beverage, which comprises a restricted item 22. The alcoholic beverage may be marked as a restricted item 22 in the item database 20, prompting the processing component 10 (coordinating the whole interaction) to verify whether the user 40 is authorized to order the restricted item 22. This verification can be done in the background without the user's participation. Specifically, the processing component 10 may access the user database 30 and verify whether the user profile 32 associated with the user 42 requesting a restricted item 22 has the first authorization associated with it. If this is the case, the processing component 10 may authorize the order and dispatch the restricted item 22 (among possibly other items) to the delivery location 50 indicated by the user 42.

The restricted item 22 may be transported by the mobile robot 100 autonomously or mostly autonomously (such as autonomously at least 80% of the travel time and/or autonomously at least 90% of the travel distance). Upon arrival to the delivery location, the mobile robot 100 preferably waits to allow access to the restricted item 22 to the user until a second authorization can be completed. The second authorization can be performed via the user's user terminal 40 and/or via the mobile robot 100. Optionally, the remote operator terminal 60 may also perform the second authorization. Upon successful completion of the second authorization, the mobile robot 100 may grant the user 42 access to the restricted item 22 and subsequently depart the delivery location 50.

Figure 2:
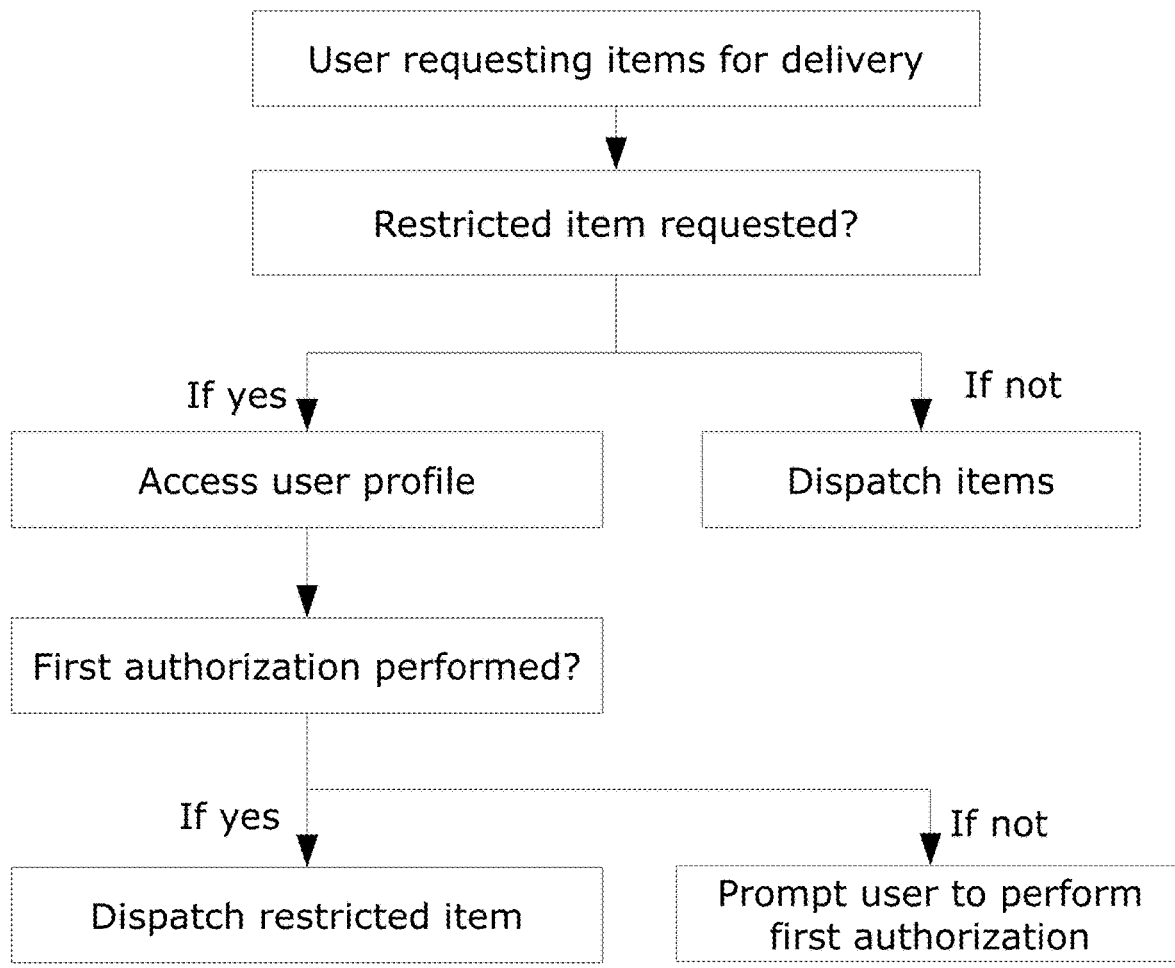
FIG. 2 schematically depicts an embodiment of a method for delivering restricted items to users.
Figure 3:
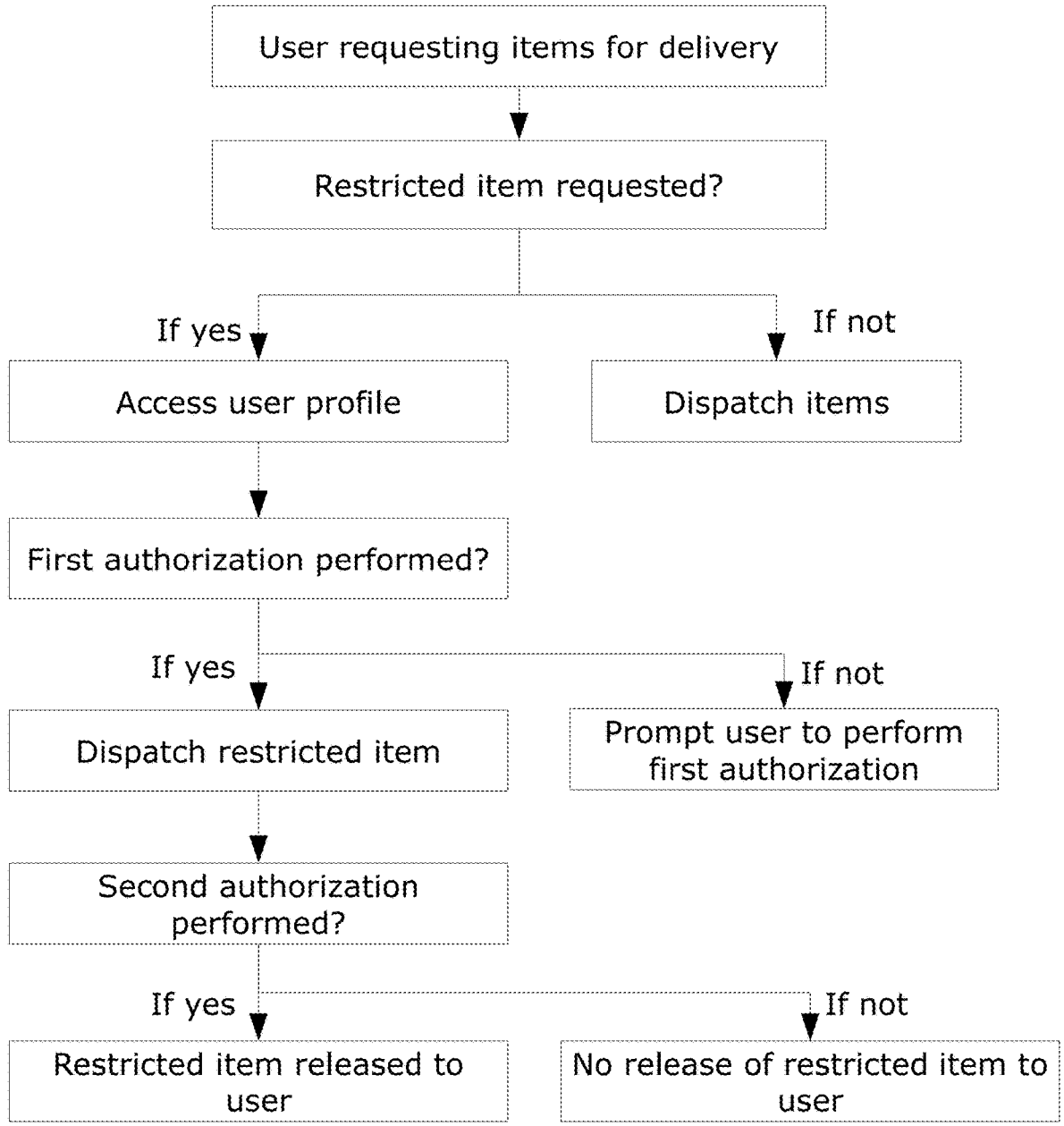
FIG. 3 shows an extended version of the method of FIG. 2.

This procedure is also shown in terms of flowcharts in FIGS. 2 and 3

FIG. 2 schematically depicts a method for delivering restricted items as a flowchart. A user requests various items for delivery. If any restricted items are requested by the user, the user's profile is accessed. Otherwise, items are dispatched for delivery.

If the user's profile is associated with a performed first authorization, restricted items are dispatched. Otherwise, the user is prompted to perform a first authorization. This can preferably be done by using the user's identification combined with at least one biometric parameter.

FIG. 3 shows a preferred continuation of the method of FIG. 2. Following dispatch of the restricted item if the first authorization is associated with the user profile, a second authorization is performed. If it is successfully performed, the restricted item is released to the user. Otherwise, the restricted item is not released to the user. The second authorization preferably takes place at the delivery location, directly preceding the user obtaining access to the restricted item. In this way, the second authorization ensures that only an authorized user gains access to the restricted item. The second authorization may differ from the first authorization in that the second authorization hinges upon the first one, and not upon the user's true identity. It can be assumed that the first authorization is sufficiently rigorous to ensure that the user's identity is correct and authorized to obtain restricted items. The second authorization then needs only to confirm that the user about to get access to the restricted items is the same user associated with the first authorization.

Figure 4:
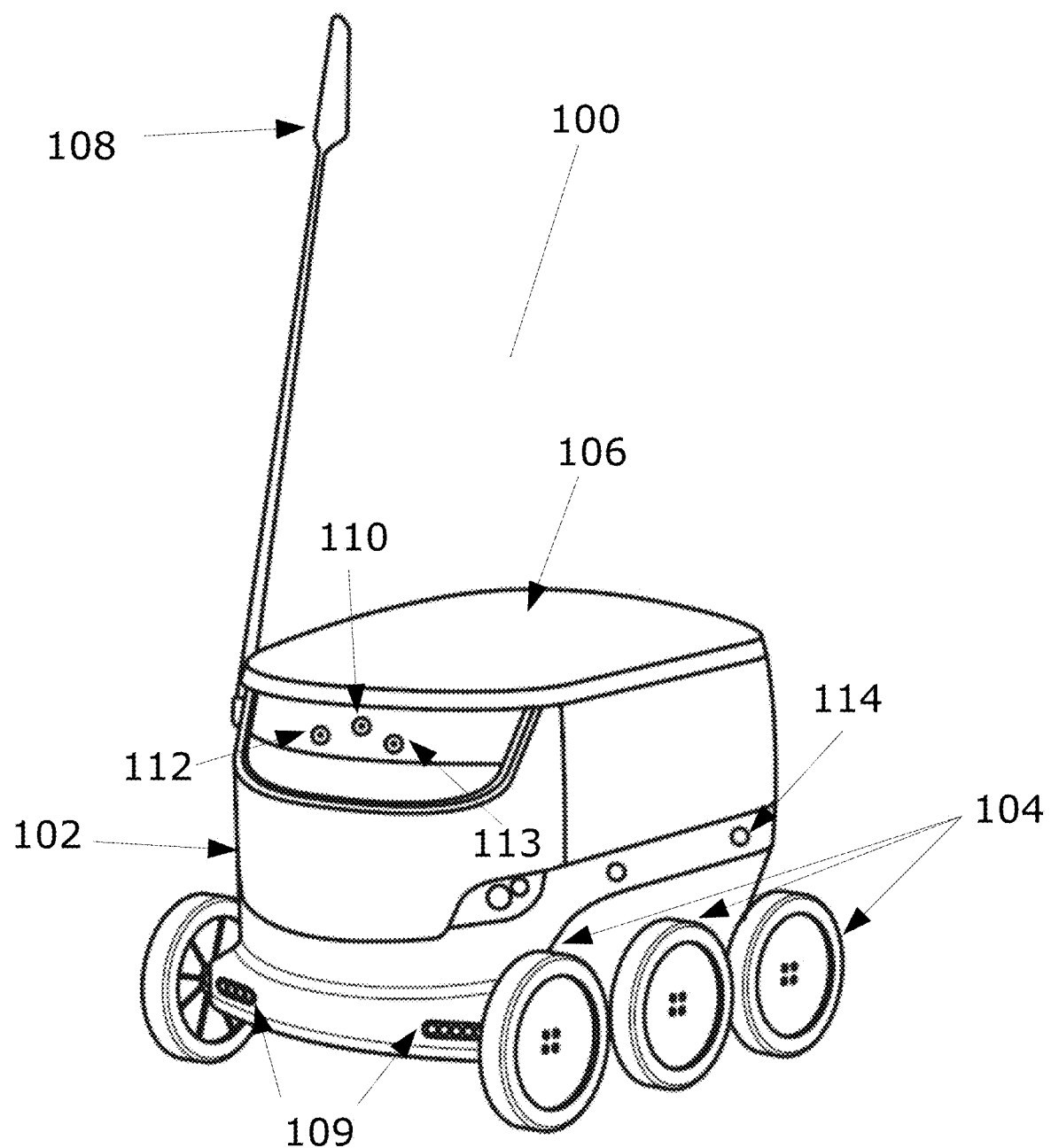
FIG. 4 shows an embodiment of a mobile robot configured to deliver restricted items as per one embodiment of the present disclosure.

FIG. 4 demonstrates an exemplary embodiment of the mobile robot 100. The mobile robot 100 can comprise a delivery or a vending robot, that is, it can transport and deliver packages, consumable items, groceries or other items to customers. Preferably, the mobile robot 100 is outfitted with a beverage module (not shown in the figure).

The mobile robot 100 comprises a robot body 102. The body 102 comprises an item compartment in which items can be placed and transported by the robot (not shown in the present figure).

The mobile robot 100 further comprises a robot motion component 104 (depicted as wheels 104). In the present embodiment, the robot motion component 104 comprises six wheels 104. This can be particularly advantageous for the mobile robot 100 when traversing curbstones or other similar obstacles on the way to delivery recipients.

The mobile robot 100 comprises a lid 106. The lid 106 can be placed over the item compartment and locked to prevent unauthorized access to the beverage module.

The mobile robot 100 further comprises a robot signaling device 108, depicted here as a flagpole or stick 108 used to increase the visibility of the robot 100. Particularly, the visibility of the robot 100 during road crossings can be increased. In some embodiments, the signaling device 108 can comprise an antenna. The mobile robot 100 further comprises robot headlights 109 configured to facilitate the robot's navigation in reduced natural light scenarios and/or increase the robot's visibility further. The headlights are schematically depicted as two symmetric lights 109, but can comprise one light, a plurality of lights arranged differently and other similar arrangements.

The mobile robot 100 also comprises robot sensors 110, 112, 113, 114. The sensors are depicted as visual cameras (110, 112, 113) and ultrasonic sensors (114) in the figure, but can also comprise radar sensors, lidar sensors, time of flight cameras and/or other sensors.

Further sensors can also be present on the mobile robot 100. One sensor can comprise a front camera 110. The front camera 110 can be generally forward facing. The sensors may also comprise front (112, 113), side and/or back stereo cameras. The front stereo cameras 112 and 113 can be slightly downward facing. The side stereo cameras (not depicted) can be forward-sideways facing. The back camera (not depicted) may be a mono or a stereo camera can be generally backward facing. The sensors present on multiple sides of the robot can contribute to its situational awareness and navigation capabilities. That is, the robot 100 can be configured to detect approaching objects and/or hazardous moving objects from a plurality of sides and act accordingly.

The robot sensors can also allow the robot 100 to navigate and travel to its destinations at least partially autonomously. That is, the robot can be configured to map its surroundings, localize itself on such a map and navigate towards different destinations using in part the input received from the multiple sensors.

Figure 5:
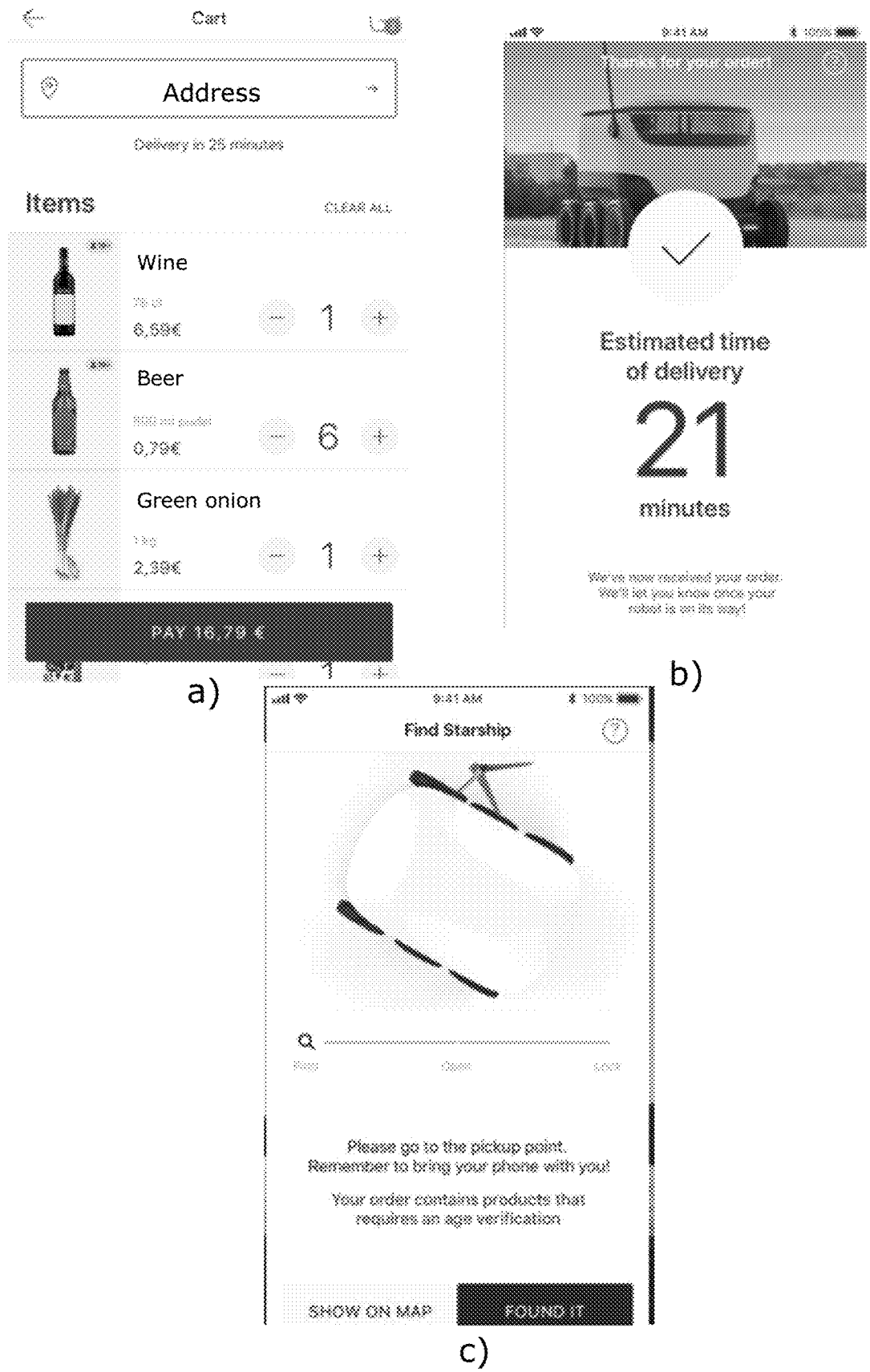
FIG. 5 shows exemplary depictions of a user interface that can be used in the present system and method for delivering restricted items.
Figure 5:
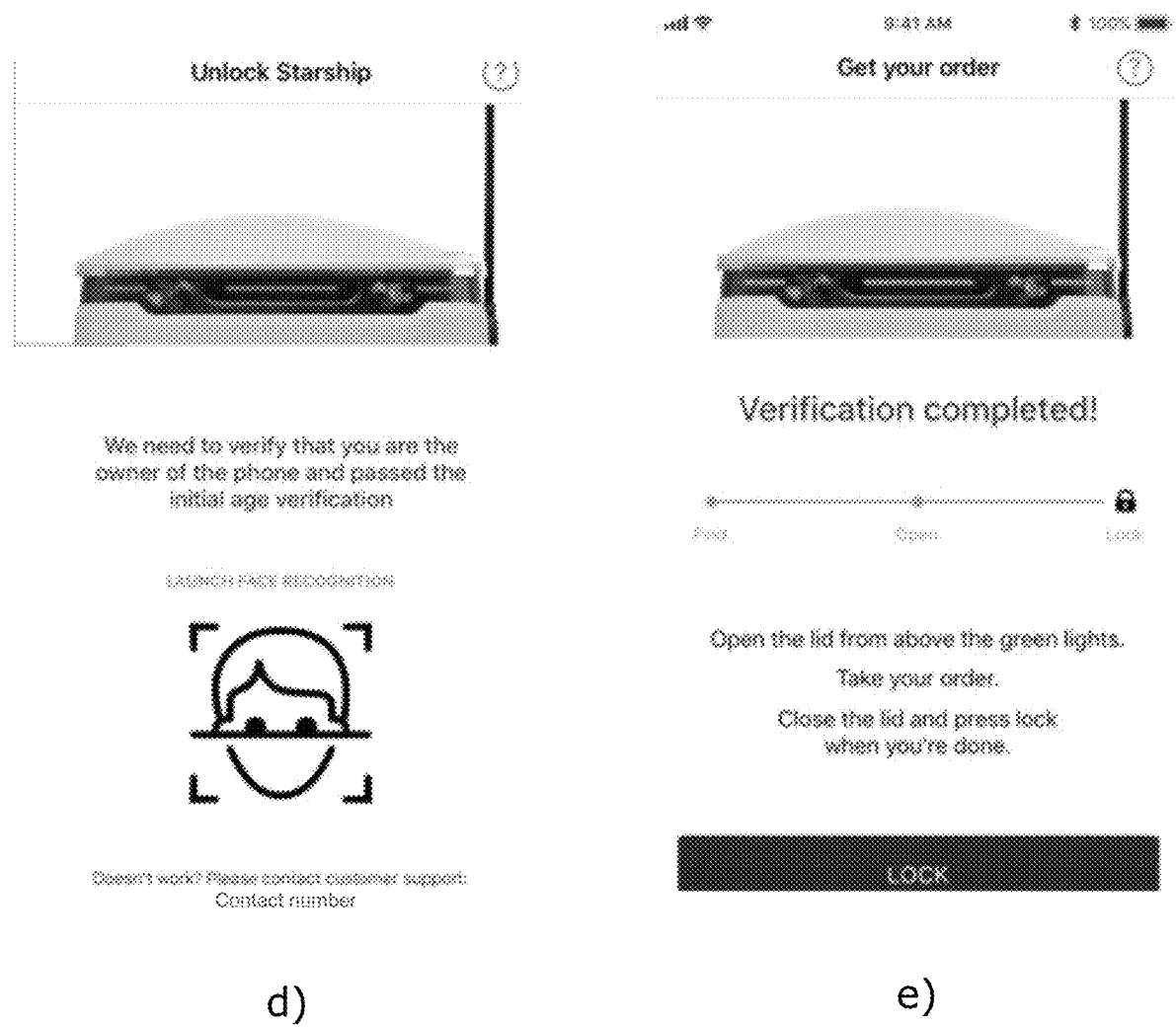

FIG. 5 shows exemplary embodiments of a user interface 40 that can be used as part of the present system and method for delivering restricted items.

The user interface 40 can be implemented as a software application for a user terminal 44 (such as a smartphone, tablet, wearable computing device, or another personal computing device). In other words, the user interface 40 can comprise an "app" used with various types of personal computing devices.

A user may use their user terminal 44 to communicate with a remote server in order to request or order certain items to be delivered.

The items may them be delivered by mobile robot, such as a mobile robot described in relation to FIG. 4.

FIG. 5a shows an exemplary screen where a user has selected a few items to be delivered to their address. In the present example, the user selected alcoholic beverages (wine and beer), as well as a vegetable. The alcoholic beverages comprise restricted items. In other words, such items cannot be delivered to an arbitrary user. Before authorizing purchase and delivery of alcoholic beverages, an age verification must be performed. The age requirements vary based on jurisdiction and can have corresponding thresholds.

Before confirming delivery of restricted items (alcoholic beverages in the present example), a server verifies that a first authorization is present in a user profile corresponding to the user making an order or request for delivery. If the first authorization is present, the request can be authorized, and the items dispatched to the user's delivery location via a mobile robot.

FIG. 5b depicts a screen indicating to the user an estimated arrival time of the mobile robot with their requested items.

FIG. 5c shows a screen instructing the user to locate the mobile robot carrying their items at the delivery location, and further specifies to the user that restricted items are part of the order, and an authorization will be needed before accessing the items.

FIG. 5d shows a screen indicating that a second authorization is required. The second authorization can serve as a confirmation that the identity of the user corresponds to the identity as verified during the first authorization. In other words, the second authorization can be less "strict" as it only needs to match one or more parameters associated with the user during the first authorization, and need not be a comprehensive identity authorization.

In the depicted scenario, the second authorization comprises facial recognition-based authorization. A user's face can be captured via a camera and compared with an image on file acquired and validated during the first authorization. The user's face may be captured by a camera of the user terminal (such as a smartphone's front camera). Additionally or alternatively, the user's face may also be captured by one or more cameras of the mobile robot. In this way, more flexibility can be provided in case one of the options for second authorization fails. Additionally, a remote operator terminal may be contacted in case all of the available automatic second authorization methods failed. In this case, the remote operator terminal may either perform the second authorization, or repeat the first authorization.

FIG. 5e shows a screen confirming that the second authorization has been successfully performed. The mobile robot's item space unlocks automatically, and the user may access their items including restricted items.

Figure 6:
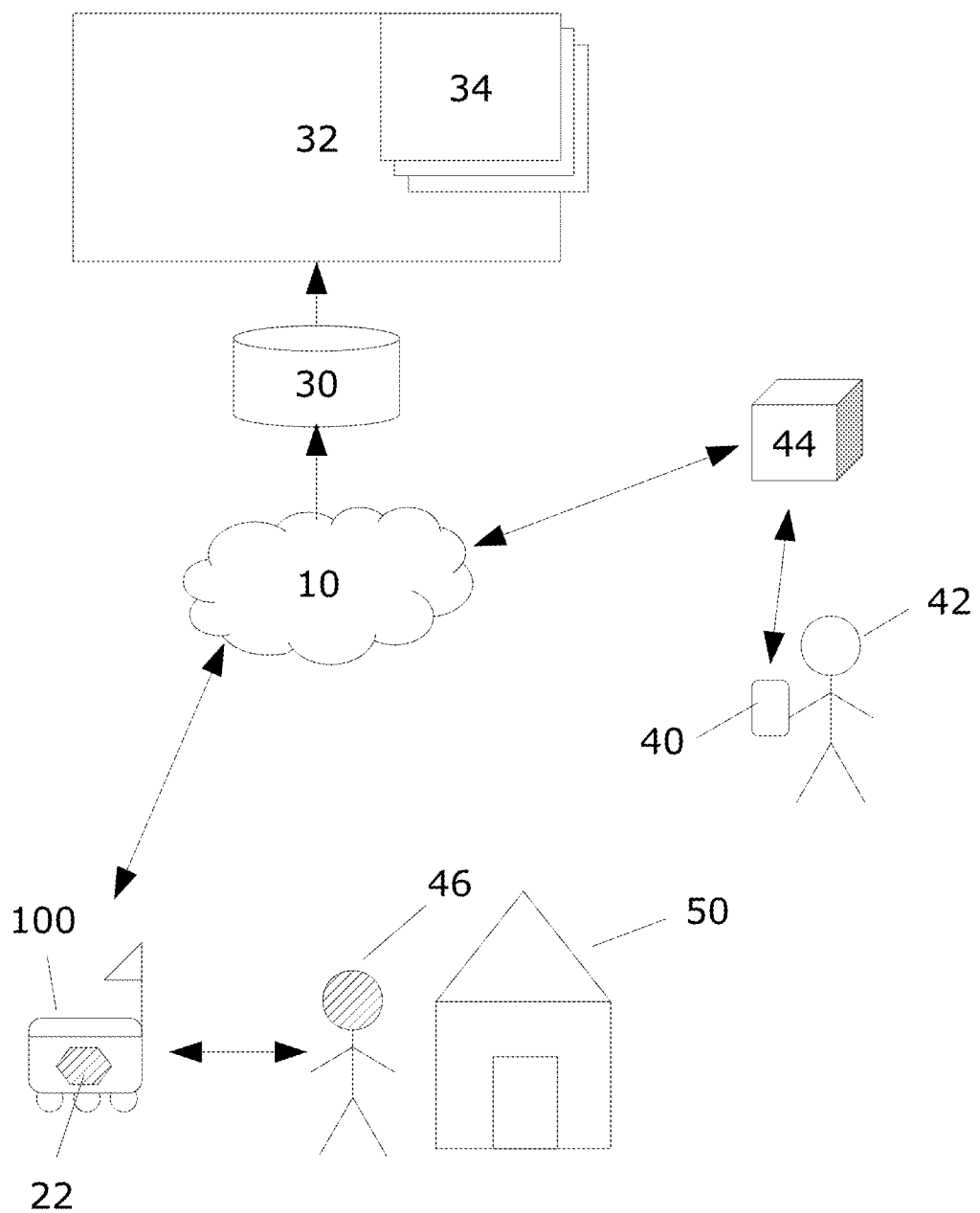
FIG. 6 schematically shows another embodiment of the present disclosure, showing a system for delivering restricted items to recipients.

FIG. 6 depicts an embodiment of the present disclosure, depicting delivery of restricted items to recipients. Contrary to the previously disclosed embodiments, recipient 46 of FIG. 6 is not necessarily the same as user 42. In the present embodiment, the user 42 may request delivery of a restricted item 22 via the user terminal 40 and a user interface 44 communicating with the processing component 10. If a first authorization associated with the user's user profile 32 is present, the processing component may authorize dispatch of the restricted item 22 via the mobile robot 100.

Once the mobile robot 100 arrives to the delivery location 50, it may be met by a recipient 46, differing from the user 42. The recipient 46 may be associated with the user 42 that requested delivery, the association stored in (or in connection with) the user profile 32. In other words, the recipient 46 may be associated with a recipient profile 34, in turn associated with (or stored as part of) the user profile 32. That is, each user profile 32 may comprise a plurality of sub-profiles for authorized recipients 46. Each of the sub-profiles or recipient profiles 34 may be associated with a first recipient authorization. That is, prior to the recipient 46 receiving the restricted item 22, a first recipient authorization should be performed for them, and associated with the user profile 32 of the user making the delivery. In practice, the first recipient authorization may be performed at the same time as the first authorization for the user 42 and/or at any time before the recipient 46 receiving the restricted item 22.

The recipient profile 34 must also be associated with the user profile 32, since neither the restricted item 22 nor any other item that the user 42 may have ordered can be transmitted to an arbitrary recipient that may not be authorized by the user to receive the item.

Associating a plurality of recipient profiles 34 to a user profile 32 may be particularly useful for households or businesses which may desire to have a common profile for ordering various items, but also have a plurality of possible recipients for those items.

Prior to the recipient 46 getting access to the restricted item 22 carried by the mobile robot 100, a second recipient authorization can be performed. The second recipient authorization can then confirm that the recipient 46 is the same person as the one that underwent the first recipient authorization and a transfer of the restricted item may take place.

LIST OF REFERENCE NUMERALS

10—Processing component
20—Item database
22—Restricted item
30—User database
32—User profile
34—Recipient profile
40—User terminal
42—User
44—User interface
46—Item recipient
50—Delivery location
60—Remote operator terminal
100—Mobile robot
102—Robot body
104—Robot motion component
106—Lid
108—Robot signaling device
109—Headlights
110—Front camera
112—Front stereo camera
113—Front stereo camera
114—Ultrasonic sensor
116—Robot communication component Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for delivering restricted items to users, the method comprising:
    detecting, in an item database and with a processing component, a restricted item selected by a user for delivery;
    accessing, in a user database and with the processing component, a user profile associated with the user;
    verifying, with the processing component, presence in the user database and/or in a separate database of an authorization for delivery of the restricted item associated with the user profile;
    upon detecting a first authorization associated with the user profile, authorizing dispatch of the restricted item to the user at a delivery location wherein authorizing dispatch comprises authorizing dispatch of a mobile robot carrying the restricted item to the delivery location;
    transporting the restricted item to the delivery location by the mobile robot, wherein the mobile robot comprises an item space, wherein the item space comprises a lid and an electronic lock and wherein the electronic lock is locked during transit;
    prior to the user receiving the restricted item, performing a second authorization to confirm a user's identity;
    upon a successful second authorization unlocking the electronic lock;
    upon a failed attempt to perform the second authorization, establishing communication between the user and a remote operator terminal via the mobile robot; and
    performing with the remote operator terminal the second authorization and/or a repetition of the first authorization.

2. The method according to claim 1, wherein the second authorization comprises matching at least one personal identification parameter of the user with the user profile comprising the first authorization and wherein the personal identification parameter is associated with the first authorization.

3. The method according to claim 2, wherein the personal identification parameter comprises a user-selected pin and wherein the user-selected pin is selected by the user during or promptly following the first authorization and is associated with the first authorization.

4. The method according to claim 2, wherein the personal identification parameter comprises a biometric parameter of the user.

5. The method according to claim 1, wherein the second authorization is performed immediately prior to the user receiving the restricted item.

6. The method according to claim 1, further comprising the mobile robot performing the second authorization upon reaching the delivery location.

7. The method according to claim 6, wherein the mobile robot comprises at least one identification sensor and wherein the method further comprises
the mobile robot using the identification sensor to perform the second authorization.

8. The method according to claim 7, wherein the identification sensor comprises a biometric sensor and wherein the method further comprises
measuring at least one biometric parameter of the user via the biometric sensor.

9. The method according to claim 1, further comprising performing the second authorization via a user terminal;
wherein the user terminal is associated with the user profile; and
wherein the user terminal is associated with the first authorization.

10. The method according to claim 1, further comprising transporting the restricted item to the delivery location;
allowing access to the restricted item at the delivery location to a recipient different than the user;
wherein the restricted item is transmitted to the recipient following a successful second recipient authorization.

11. The method according to claim 1, further comprising transporting the restricted item to the delivery location; and
detecting a recipient different than the user at the delivery location; and
verifying presence of a recipient profile associated with the user profile;
verifying presence of an authorization for delivery of the restricted item associated with the user profile;
upon detecting a first recipient authorization associated with the recipient profile, performing a second recipient authorization to confirm a recipient's identity; and
upon successful second recipient authorization, allowing the recipient access to the restricted item.

12. A system for delivering restricted items to users, the system comprising:
an item database of items for delivery, the item database comprising restricted items;
a user interface configured to access the item database;
a user database comprising user profiles;
a processing component configured to at least:
detect a restricted item from the item database selected by a user for delivery via the user interface;
access a user profile associated with the user in the user database;
verify presence in the user database and/or in a separate database of an authorization for delivery of the restricted item associated with the user profile; and
upon detecting a first authorization associated with the user profile, authorize dispatch of the restricted item to the user at a delivery location; and
the system further comprising a mobile robot,
wherein the processing component is configured to authorize dispatch of the mobile robot carrying the restricted item to the delivery location, and
wherein the mobile robot is configured to transport the restricted item to the delivery location,
wherein the mobile robot comprises an item space, wherein the item space comprises a lid and an electronic lock and wherein the electronic lock is locked during transit;
wherein prior to the user receiving the restricted item, the processing component and/or the mobile robot is configured to perform a second authorization to confirm a user's identity;
wherein upon a successful second authorization, the processing component and/or the mobile robot is configured to unlock the electronic lock,
wherein the system comprises a remote operator terminal, and
wherein upon a failed attempt to perform the second authorization:
the mobile robot is configured to establish a communication between the user and the remote operator terminal, and
the remote operator terminal is configured to perform the second authorization and/or a repetition of the first authorization.

13. The system according to claim 12, further comprising a user terminal configured to exchange data with the processing component and wherein the processing component is configured to perform a second authorization based on data received from the user terminal to confirm a user's identity prior to the user receiving the restricted item; and wherein the second authorization comprises matching at least one personal identification parameter of the user input via the user terminal with the user profile comprising the first authorization.

14. The system according to claim 13,
wherein the user terminal further comprises at least one biometric sensor configured to detect at least one biometric parameter of the user; and
wherein the user terminal is configured to send the detected biometric parameter to the processing component and the processing component is configured to validate the association between the first authorization and the biometric parameter stored in the user profile.

15. The system according to claim 12, wherein the mobile robot is configured to communicate with the processing component in order to perform a second authorization of the user at the delivery location.

16. The method according to claim 1, wherein the second authorization is performed by the mobile robot at the delivery location and wherein the mobile robot performs the second authorization using a mobile robot's local memory and without connecting to a server.

17. The method according to claim 1, wherein the method comprises:
attempting to perform the second authorization via a user terminal; and upon a failed attempt to perform the second authorization via a user terminal, attempting to perform the second authorization via the mobile robot.

18. The system according to claim 12, wherein the mobile robot comprises a mobile robot's local memory and wherein the mobile robot is configured to perform the second authorization at the delivery location using the mobile robot's local memory and without connecting to a server.

19. The system according to claim 12,
wherein the system comprises a user terminal configured to perform the second authorization, and
wherein the mobile robot is configured to perform the second authorization upon a failed attempt to perform the second authorization via the user terminal.

\* \* \* \* \*